United States Patent
Morris et al.

(10) Patent No.: US 7,625,178 B2
(45) Date of Patent: Dec. 1, 2009

(54) HIGH EFFECTIVENESS COOLED TURBINE BLADE

(75) Inventors: Mark C. Morris, Phoenix, AZ (US); George W. Wolfmeyer, Tempe, AZ (US); Luis A. Tapia, Tempe, AZ (US); Vivek Agarwal, Chandler, AZ (US); Kin Poon, Tempe, AZ (US); Jason C. Smoke, Phoenix, AZ (US); William C. Baker, Phoenix, AZ (US); Henry M. Armstrong, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 406 days.

(21) Appl. No.: 11/513,759

(22) Filed: Aug. 30, 2006

(65) Prior Publication Data

US 2008/0056908 A1    Mar. 6, 2008

(51) Int. Cl.
*F01D 5/08* (2006.01)

(52) U.S. Cl. .................. 416/97 R; 29/889.7; 29/889.72; 29/889.721

(58) Field of Classification Search .................. 415/115; 416/92, 97 R; 164/132, 137, 339, 345, 369
See application file for complete search history.

(56) References Cited

U.S. PATENT DOCUMENTS

| | | | |
|---|---|---|---|
| 5,462,405 A * | 10/1995 | Hoff et al. .................. | 416/97 R |
| 5,857,837 A | 1/1999 | Zelesky et al. | |
| 5,902,093 A | 5/1999 | Liotta et al. | |
| 5,975,851 A | 11/1999 | Liang | |
| 6,347,923 B1 | 2/2002 | Semmler et al. | |
| 6,419,449 B2 | 7/2002 | Ferber | |
| 6,602,052 B2 | 8/2003 | Liang | |
| 6,644,921 B2 * | 11/2003 | Bunker et al. ............. | 416/97 R |
| 6,824,359 B2 | 11/2004 | Chlus et al. | |
| 6,974,308 B2 * | 12/2005 | Halfmann et al. ......... | 416/97 R |
| 7,008,186 B2 | 3/2006 | Heeg et al. | |
| 7,014,424 B2 | 3/2006 | Cunha et al. | |
| 2002/0176776 A1 | 11/2002 | Parneix et al. | |
| 2002/0182074 A1 | 12/2002 | Bunker | |
| 2003/0026698 A1 * | 2/2003 | Flodman et al. ........... | 416/97 R |
| 2003/0223870 A1 | 12/2003 | Keith et al. | |
| 2005/0106020 A1 | 5/2005 | Bunker et al. | |
| 2005/0111979 A1 | 5/2005 | Liang | |

(Continued)

*Primary Examiner*—Edward Look
*Assistant Examiner*—Aaron R Eastman
(74) *Attorney, Agent, or Firm*—Ingrassia Fisher & Lorenz, P.C.

(57) ABSTRACT

An air-cooled turbine blade is provided having an airfoil shape defined by a convex suction side wall, a concave pressure side wall, a leading edge, a trailing edge, a root and a tip, the walls and the tip each including an interior surface that defines an interior with the root, the trailing edge including a plurality of slots formed thereon. The blade includes a suction side flow circuit formed therein comprising a forward and an aft flow circuit. The blade also includes a tip flow circuit extending along the tip interior surface to at least one of the trailing edge slots and including a first and a second opening, the first opening in flow communication with the suction side forward flow circuit outlet, and the second opening in flow communication with a cross-over hole of the suction side aft flow circuit. Methods of manufacturing the blade are also provided.

20 Claims, 9 Drawing Sheets

U.S. PATENT DOCUMENTS

| | | |
|---|---|---|
| 2005/0129516 A1 * | 6/2005 | Rinck et al. ............... 416/97 R |
| 2005/0175452 A1 | 8/2005 | Dube et al. |
| 2005/0220618 A1 | 10/2005 | Zhang et al. |
| 2005/0232768 A1 * | 10/2005 | Heeg et al. ................ 416/97 R |
| 2005/0232771 A1 | 10/2005 | Harvey et al. |
| 2005/0265841 A1 | 12/2005 | Magowan et al. |
| 2005/0265842 A1 | 12/2005 | Mongillo, Jr. et al. |
| 2005/0265843 A1 | 12/2005 | Propheter et al. |
| 2005/0265844 A1 | 12/2005 | Levine |
| 2006/0034690 A1 | 2/2006 | Papple |
| 2007/0201980 A1 * | 8/2007 | Morris et al. ............. 416/97 R |

* cited by examiner

US 7,625,178 B2

HIGH EFFECTIVENESS COOLED TURBINE BLADE

STATEMENT REGARDING FEDERALLY SPONSORED RESEARCH OR DEVELOPMENT

This invention was made with Government support under DAAJ02-94-C-0030 awarded by the United States Army. The Government has certain rights in this invention.

TECHNICAL FIELD

The present invention relates to turbine vanes and blades and, more particularly, to high temperature turbine vanes and blades designed for high effectiveness cooling and ease of manufacture.

BACKGROUND

Gas turbine engines, such as turbofan gas turbine engines, may be used to power various types of vehicles and systems, such as, for example, aircraft. Typically, these engines include turbine blades (or airfoils) that are impinged by high-energy compressed air that causes a turbine of the engine to rotate at a high speed. Consequently, the blades are subjected to high heat and stress loadings which, over time, may reduce their structural integrity.

Modern aircraft jet engines have employed internal cooling systems in the blades to maintain the blade temperatures within acceptable limits. Typically, the blades are air cooled using, for example, bleed air from a compressor section of the engine. The air may enter near the blade root, and then flow through a cooling circuit formed in the turbine blade. The cooling circuit typically consists of a series of connected cooling passages that form serpentine paths, which increase the cooling effectiveness by extending the length of the air flow path.

One exemplary cooling system is multi-walled and includes independent cooling circuits for surfaces of a blade, such as pressure and suction side surfaces, to thereby control specific heat load distributions thereon. The walls form intricate passages through which the cooling air flows to feed serpentine thin outer wall passages that incorporate pin fins, turbulators, turning vanes, and other structures therein. Although the cooling system operates adequately to cool most of the blade's pressure and suction side surfaces, it has been found that some portions of the blade may not be sufficiently cooled. Specifically, in some instances when a blade tip is exposed to extreme heat environments, the tip may oxidize and, thus, may become prematurely worn.

Hence, there is a need for an improved cooling system that is capable of cooling a blade tip in extreme heat environments without allowing the blade to become prematurely worn. Additionally, it would be desirable for the system to be designed such that the blade may be manufactured relatively easily and inexpensively.

BRIEF SUMMARY

The present invention provides an air-cooled turbine blade having an airfoil shape defined by a convex suction side wall, a concave pressure side wall, a leading edge, a trailing edge, a root and a tip, the walls and the tip each including an interior surface that defines an interior with the root, the trailing edge including a plurality of slots formed thereon.

In one embodiment, and by way of example only, the turbine blade includes a suction side flow circuit and a tip flow circuit. The suction side flow circuit is formed within the blade interior and comprises a forward and an aft flow circuit. The forward flow circuit extends from the root to the tip and is defined at least by the interior surface of the convex suction side wall. The forward flow circuit includes an outlet. The aft flow circuit is formed within the blade interior and is defined at least in part by the convex suction side wall. The aft flow circuit comprises a serpentine passage section, a pin bank section, and a cross-over hole. The serpentine passage section is in flow communication with the pin bank section, the pin bank section is in flow communication with at least one of the trailing edge slots, and the cross-over hole is formed on the serpentine passage section. The tip flow circuit extends along the tip interior surface to at least one of the trailing edge slots and includes a first and a second opening. The first opening is in flow communication with the suction side forward flow circuit outlet, and the second opening is in flow communication with the suction side aft flow circuit cross-over hole.

In another embodiment, and by way of example only, the turbine blade includes a suction side flow circuit, a tip flow circuit, a pressure side flow circuit, and a center flow circuit. The suction side flow circuit is formed within the blade interior and comprises a forward and an aft flow circuit. The forward flow circuit extends from the root to the tip, is defined at least by the interior surface of the convex suction side wall, and includes an outlet. The aft flow circuit is formed within the blade interior and is defined at least in part by the convex suction side wall. The aft flow circuit comprises a serpentine passage section, a pin bank section, and a cross-over hole. The serpentine passage section is in flow communication with the pin bank section, the pin bank section is in flow communication with at least one of the trailing edge slots, and the cross-over hole is formed on the serpentine passage section. The tip flow circuit extends along the tip interior surface to at least one of the trailing edge slots and includes a first and a second opening. The first opening is in flow communication with the suction side forward flow circuit outlet, and the second opening is in flow communication with the suction side aft flow circuit cross-over hole. The pressure side flow circuit is formed within the blade interior and is defined at least in part by the concave pressure side wall. The pressure side flow circuit includes a serpentine passage. The center flow circuit is formed within the blade interior in between the suction side flow circuit and the pressure side flow circuit and includes a supercharging hole formed thereon. The supercharging hole is in flow communication with the tip flow circuit.

In still another embodiment, a method is provided for manufacturing a blade having an airfoil shape defined by a convex suction side wall, a concave pressure side wall, a leading edge, a trailing edge, a root and a tip, the walls and the tip each including an interior surface that defines an interior with the root, the trailing edge including a plurality of slots formed thereon. The method includes the step of forming a plurality of cores shaped substantially similarly to a plurality of flow circuits comprising a suction side flow circuit comprising a forward and an aft flow circuit, the forward flow circuit configured to extend from the root to the tip along the interior surface of the convex suction side wall and to include an outlet, and the aft flow circuit configured to extend along the convex suction side wall and comprising a serpentine passage section, a pin bank section, and a cross-over hole, the serpentine passage section in flow communication with the pin bank section, the pin bank section in flow communication with at least one of the trailing edge slots, and the cross-over hole formed on the serpentine passage section, and a tip flow circuit configured to extend along the tip interior surface to at least one of the trailing edge slots. The method also includes forming the blade around the cores such that the tip flow circuit includes a first and a second opening, the first opening is in flow communication with the suction side forward flow circuit outlet, and the second opening is in flow communication with the suction side aft flow circuit cross-over hole. The method also includes the step of removing the cores from the blade.

Other independent features and advantages of the preferred blade will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
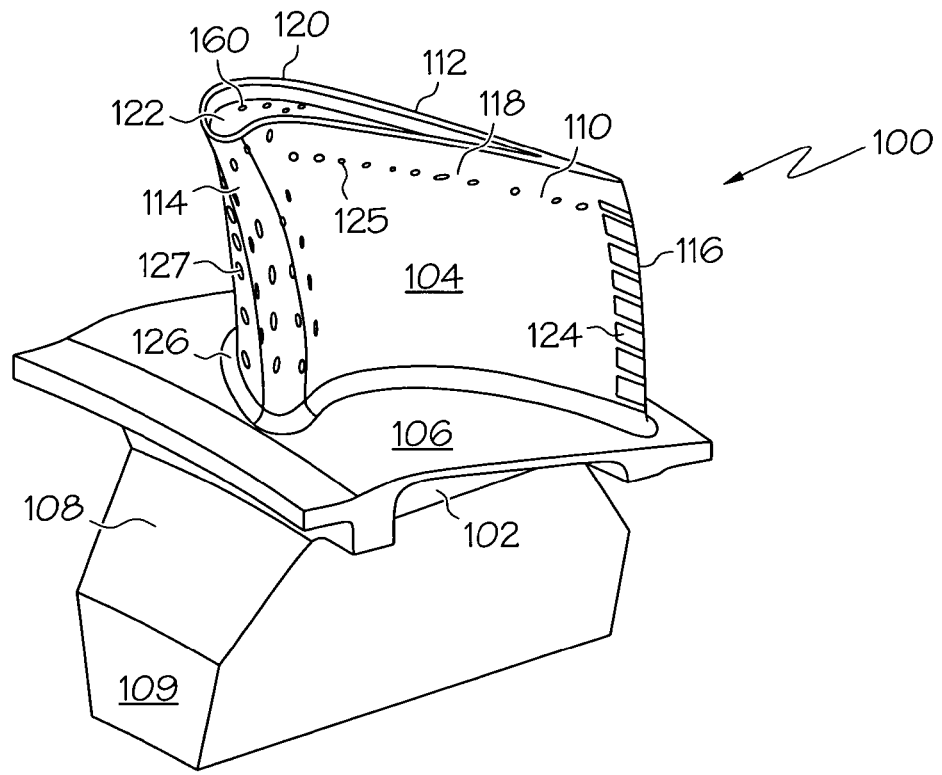
FIG. 1 is a perspective pressure (concave) side view of an engine turbine rotor blade that incorporates an exemplary airfoil of the blade.
Figure 2:
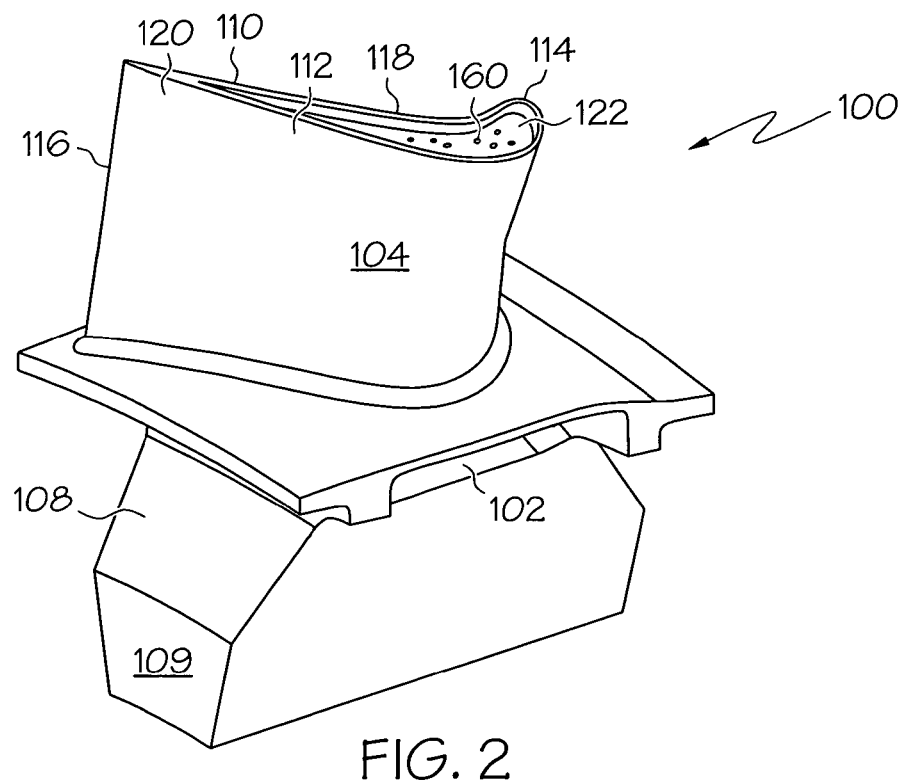
FIG. 2 is another perspective suction (convex) side view of the engine turbine rotor blade of FIG. 1.
Figure 3:
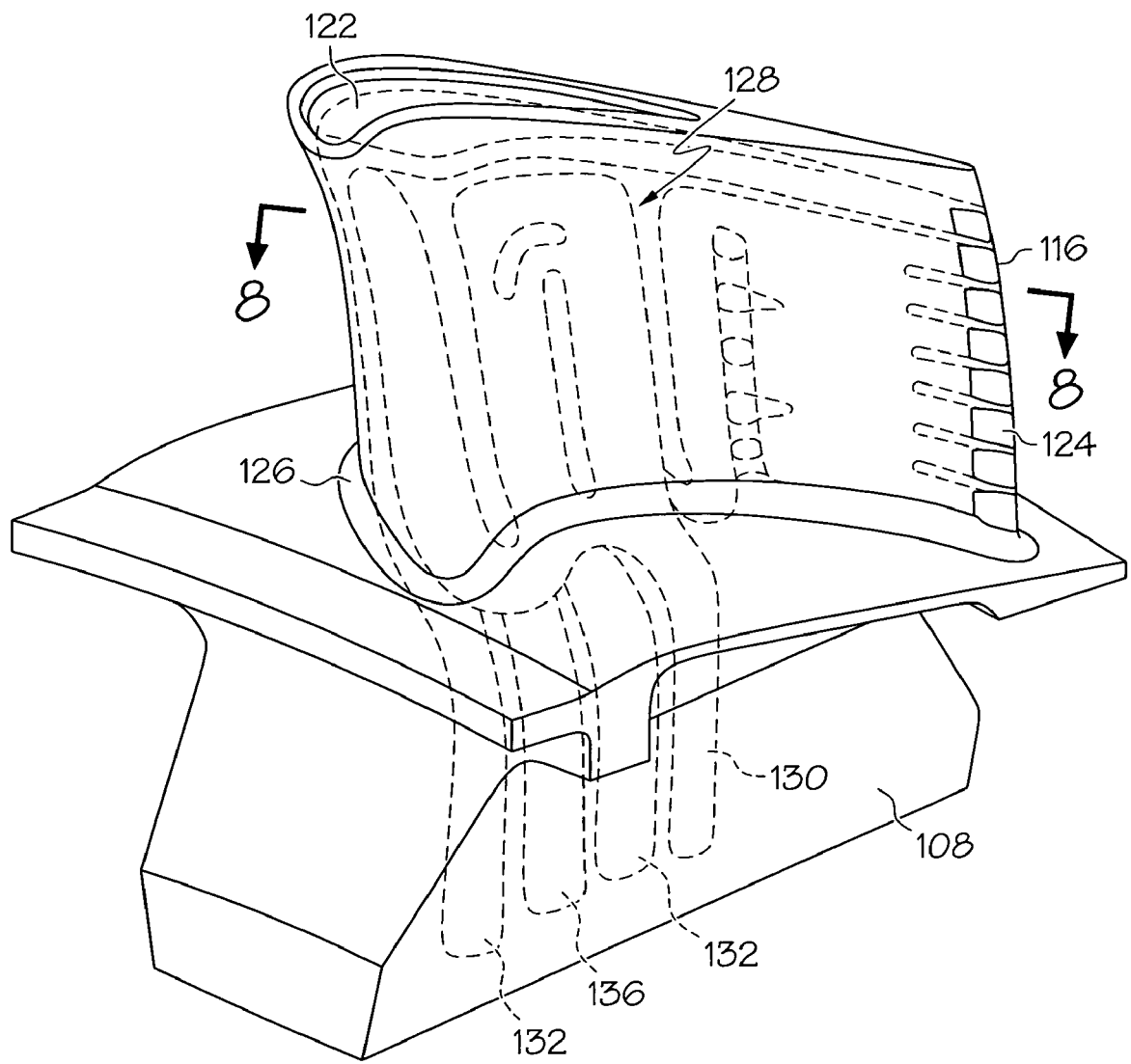
FIG. 3 is a perspective view of the blade showing the blade cooling circuits in dotted lines.

FIGS. 1 and 2 illustrate an exemplary aircraft jet engine turbine rotor blade 100 that includes a shank 102, an airfoil 104, a platform 106 and a root 108. The platform 106 is configured to radially contain turbine airflow. The root 108 provides an area in which a firtree 109 is machined. The firtree 109 is used to attach the blade 100 to a turbine rotor disc (not illustrated). It will be appreciated that in other embodiments, any one of numerous other shapes suitable for attaching the blade 100 to the turbine disc, may be alternatively machined therein. The airfoil 104 has a concave outer wall 110 and a convex outer wall 112, each having outer surfaces that together define an airfoil shape. The airfoil shape includes a leading edge 114, a trailing edge 116, a pressure side 118 along the first outer wall 110, a suction side 120 along the second outer wall 112, a blade tip 122, one or more trailing edge slots 124, cooling holes 125, 160, and an airfoil platform fillet 126.

Turning now to FIGS. 3-7, perspective views of the blade 100 and reverse images of an internal cooling circuit 128 formed therein are provided. The internal cooling circuit 128 is configured to cool the pressure side wall 110, suction side wall 112, and tip 122 by directing air from an inlet formed in the root 108 to the trailing edge slots 124 and/or cooling holes 125 and 160. The internal cooling circuit 128 is made up of a plurality of flow circuits and includes a pressure side flow circuit 130, a suction side flow circuit 132, a tip flow circuit 134, and a center flow circuit 136. The pressure side flow circuit 130 directs air from the root 108 along the pressure side wall 110. The suction side flow circuit 132 receives air from the root 108 and directs the air along the suction side wall 112. The tip flow circuit 134 receives air from a portion of the suction side flow circuit 132 and the center flow circuit 136 and directs the air along the tip 122. The center flow circuit 136 takes air from the root 108 and cools internal walls that also define portions of the other flow circuits 130, 132, 134. Each of these flow circuits 130, 132, 134, 136 will now be discussed in detail.

Figure 4:
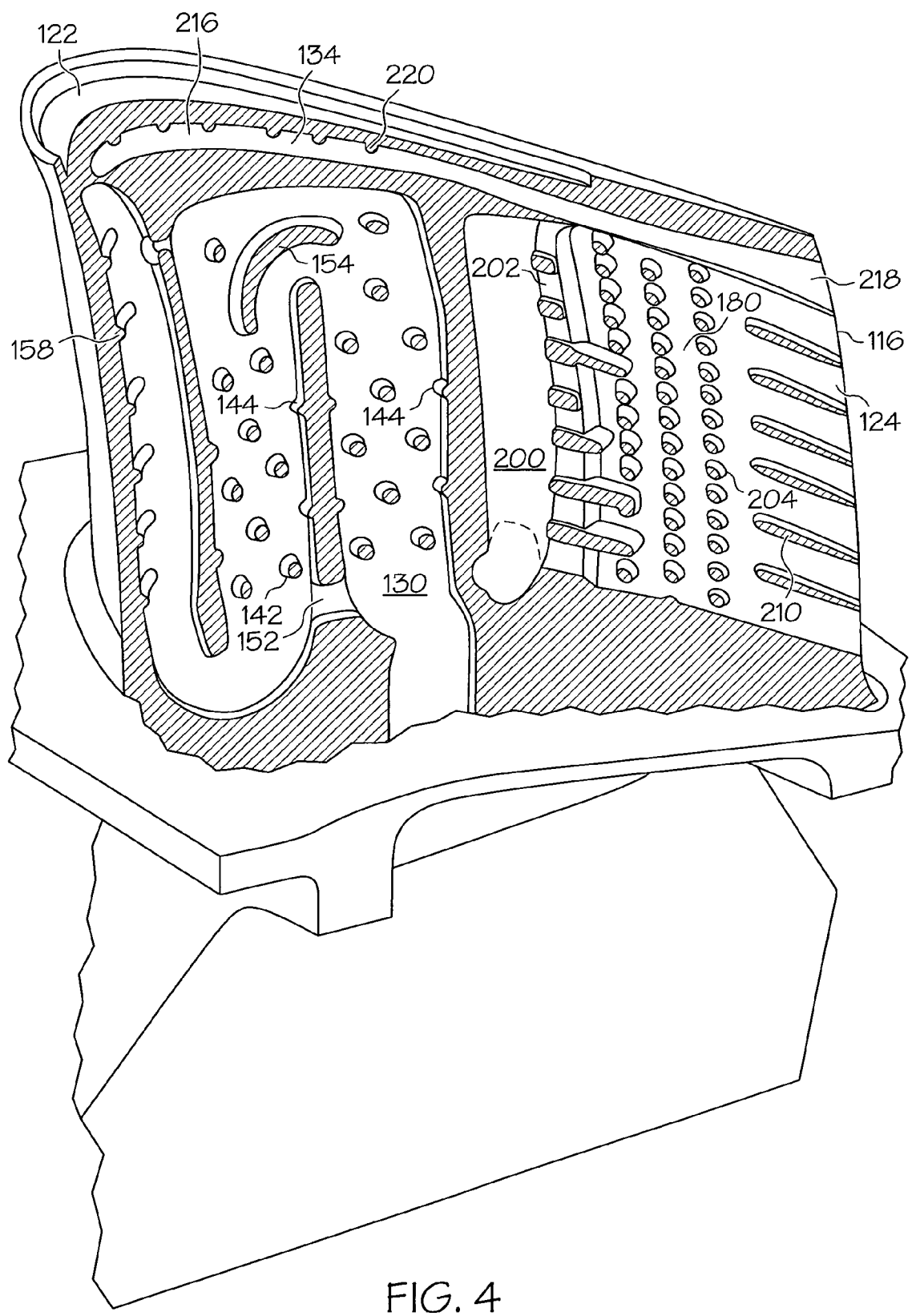
FIG. 4 is an enlarged cutaway perspective view similar in direction to that of FIG. 1.
Figure 6:
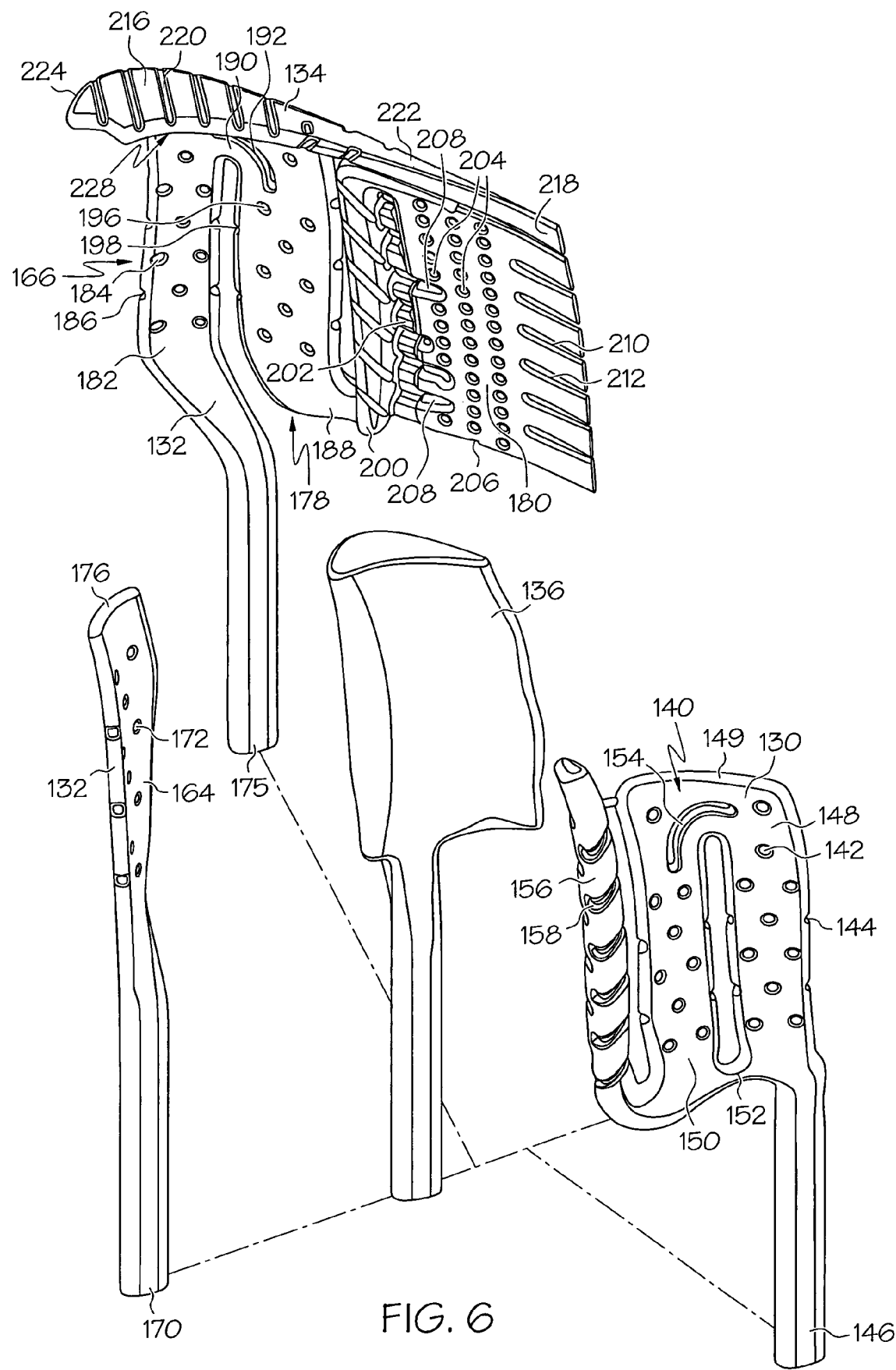
FIG. 6 is a reverse image of a pressure side exploded view of the exemplary cooling circuits shown in FIGS. 4 and 5.
Figure 8:
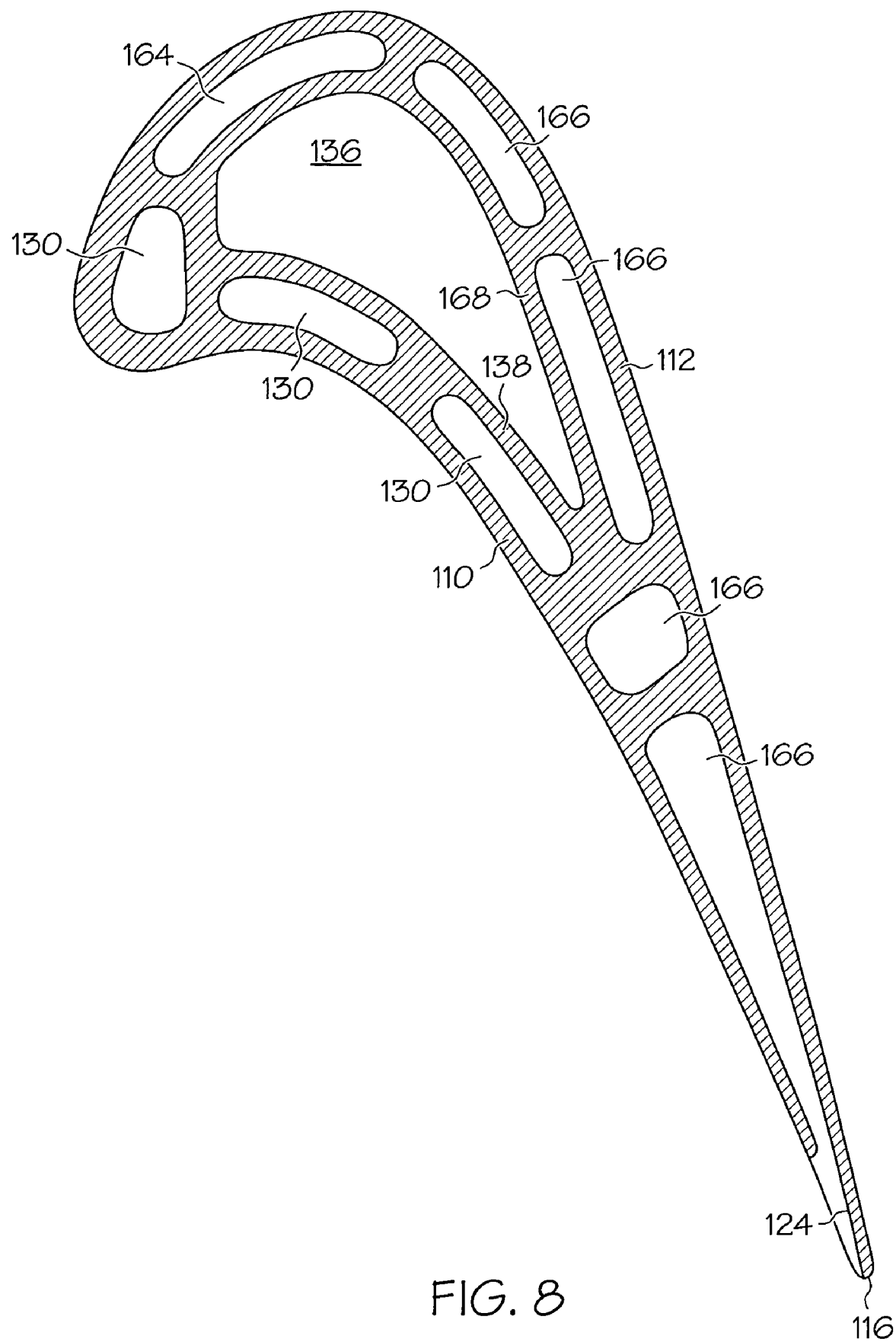
FIG. 8 is a cross section view of the blade taken along lines 8-8 of FIG. 3.

With reference to FIGS. 4, 6, and 8, the pressure side flow circuit 130 is defined, in part, by the pressure side wall 110 and an interior wall 138 (shown in FIG. 8). The interior wall 138 isolates the pressure side flow circuit 130 from the other flow circuits 132, 134, 136. To enhance cooling of the pressure side wall 110, the pressure side flow circuit 130 is made up of a three segment serpentine passage 140 which includes a plurality of full pin fins 142 and half pins 144 that optimize flow and heat transfer characteristics of the flow circuit 130.

During operation, the cooling air enters a pressure side flow circuit inlet 146 and proceeds radially outwardly into a first segment 148 of the serpentine passage 140, curves around a bend 149, and into a second segment 150. In some embodiments, a shunt channel 152 may be incorporated proximate the inlet 146 between the first and second segments 148, 150 to thereby provide flow communication therebetween. In still other embodiments, a turning vane 154 may be disposed in the bend 149. In these cases, the pins 142, 144 and turning vane 154 are preferably positioned to disperse the flow of air through the flow circuit 130 such that the airflow does not separate from the interior surfaces of the walls 110, 138. Such positioning allows maximization of the cooling effectiveness of the flow circuit 130, while minimizing the possibility of a pressure drop that is typically associated with regions where airflow separates from a wall. After the air travels through the second segment 150, it is directed radially outwardly along a third segment 156 that includes a plurality of turbulators 158 disposed therein. The air then exits the pressure side flow circuit 130 through a plurality of cooling holes 125 formed through the concave pressure side wall 110 and through a plurality of cooling holes 127 formed through the leading edge 114.

With reference to FIGS. 5-8, as mentioned briefly above, the suction side flow circuit 132 directs cooling air from the root 108 along the suction side wall 112 and out one or more of the trailing edge slots 124 or cooling holes 125 and 160 formed on the pressure side wall 110 and on the blade tip 122. The suction side flow circuit 132 is divided into a suction side forward flow circuit 164 and a suction side aft flow circuit 166. The suction side forward flow circuit 164 is defined by the suction side wall 112 and an interior wall 168 (shown in FIG. 8) and draws its cooling air from an inlet channel 170. Both full pin fins 172 and half pin fins 174 are utilized in the forward flow circuit 164 to optimize the flow and heat transfer characteristics therein. The suction side forward flow circuit 164 also has an outlet 176 that communicates with and contributes cooling air to the tip flow circuit 134.

The suction side aft flow circuit 166 is defined by the suction side wall 112 and the interior wall 168 and includes a three segment serpentine passage section 178 and a pin bank section 180. A first segment 182 of the serpentine passage section 178 is configured to draw air from the inlet channel 175 and to direct the cooling air radially outwardly and includes a plurality of pins 184 and half pins 186 therein. The first segment 182 is connected to a second segment 188 by a bend 190, within which a turning vane 192 is disposed to divide the cooling air into at least two air flows. One portion of the airflow is directed radially outwardly to flow over the turning vane 192. Air drawn from the tip flow circuit 134 joins the airflow portion via a cross-over hole 194. Another portion of the airflow is directed to the second segment 188, which directs the cooling air radially inwardly and also includes pins 196 and half pins 198. A third segment 200 communicates with the second segment 188 and is configured to direct the cooling air radially outwardly. Several cross over holes 202 are located along the length of the third segment 200 and fluidly communicate with the pin bank section 180. The pin bank section 180 includes a plurality of pins 204 and half pins 206 and is configured to direct the air out the trailing edge slots 124.

In other embodiments, the pin bank section 180 may employ various additional features that enhance cooling of the pressure side wall 110 and suction side wall 112. For example, straightening vanes 208 may be incorporated to impede the tendency of the air to initially pass radially between rows of pins 204, thereby improving airflow distribution, reducing air flow separation, and minimizing unwanted low heat transfer regions in the pin bank section 180. In still other embodiments, the pin bank section 180 may be designed such that two pin fins 204 are positioned between trailing edge teardrops 210, 212 which form trailing edge slot exit flow dividers. As a result, counter rotating canceling vortices are created at the exit of the pin bank section 180 thereby producing a flow field that is more uniform than those of previously known pin distribution configurations. The vortex pairs may result in a higher total pressure distribution for the exiting flow at the trailing edge slot 124 and a higher film effectiveness thereon, thus improving the temperature distribution at the trailing edge 116 of the blade 100.

Figure 5:
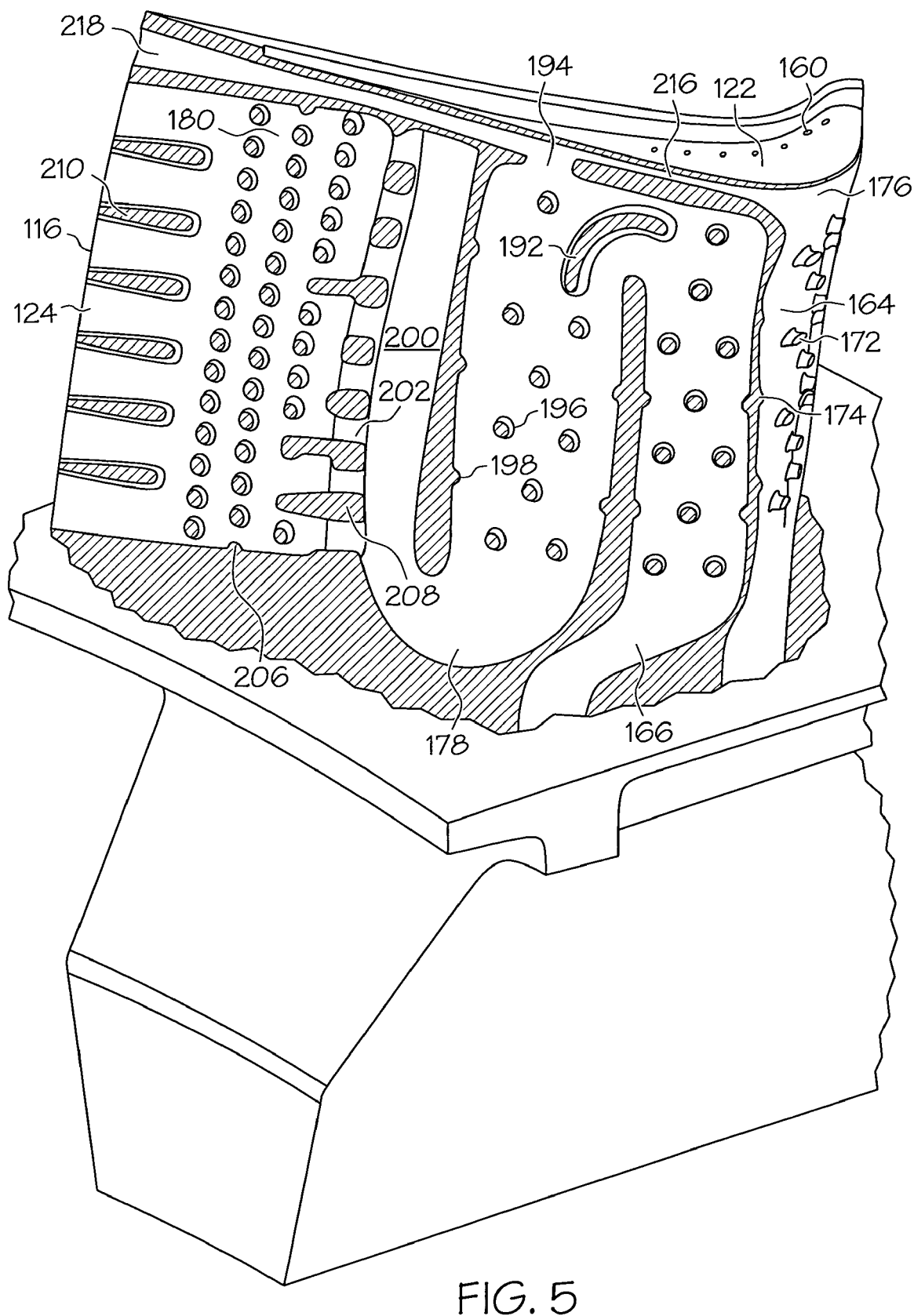
FIG. 5 is an enlarged cutaway perspective view similar in direction to that of FIG. 2.
Figure 7:
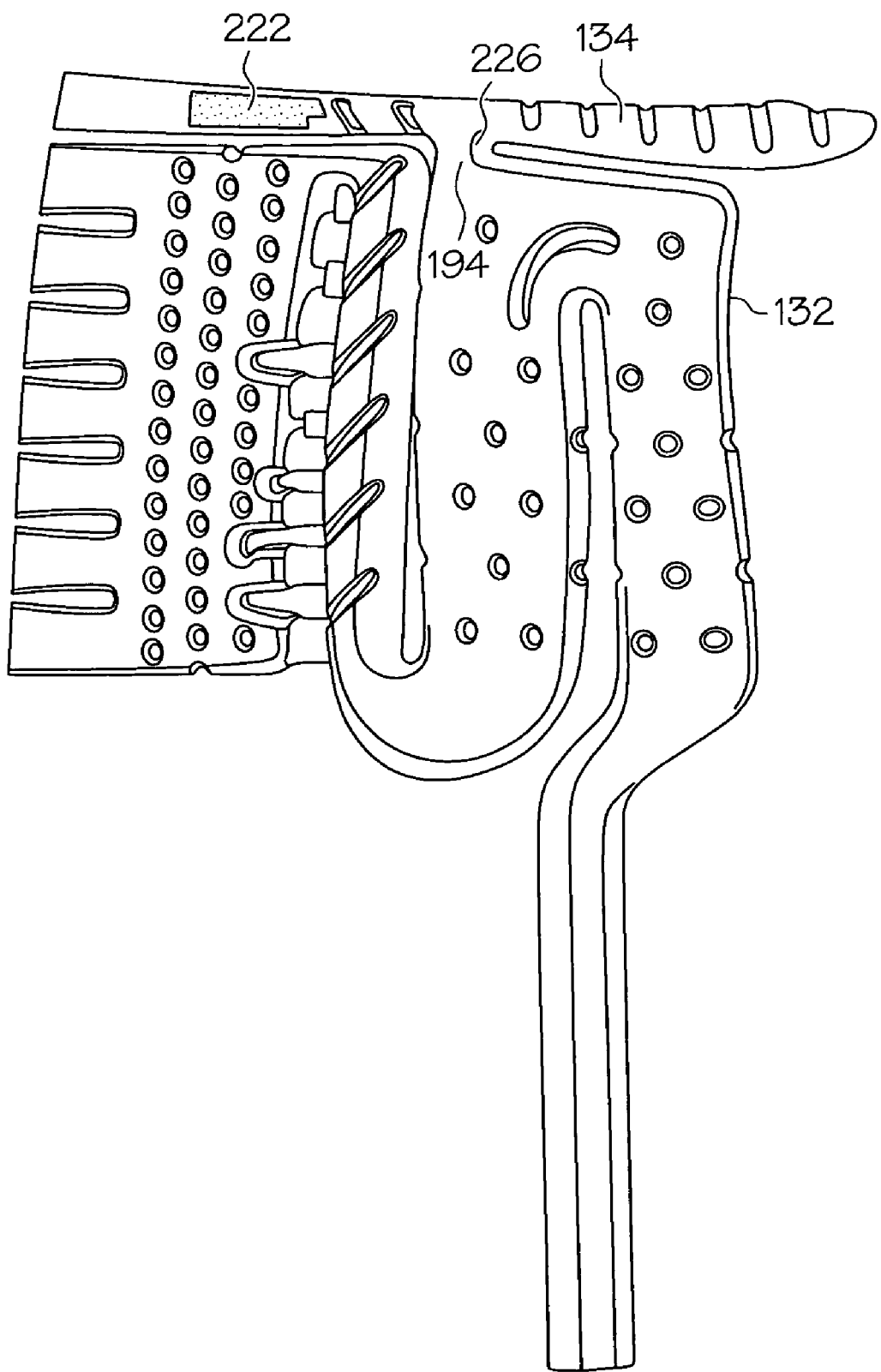
FIG. 7 is a reverse image of a suction side view of an exemplary suction side aft and tip flow circuits depicted in FIG. 6.

With continued reference to FIGS. 5-7, the tip flow circuit 134 cools and is defined in part by the blade tip 122. As briefly mentioned above, the tip flow circuit 134 receives a portion of its cooling air from the suction side forward flow circuit 164. In this regard, the tip flow circuit 134 includes a first opening 224 that communicates with the suction side forward flow circuit outlet 176 and includes a second opening 226 that communicates with the suction side aft flow circuit cross-over hole 194. The second opening 226 provides a portion of air through the cross-over hole 194 to help cool the suction side aft cavities 188 and 200.

Figure 9:
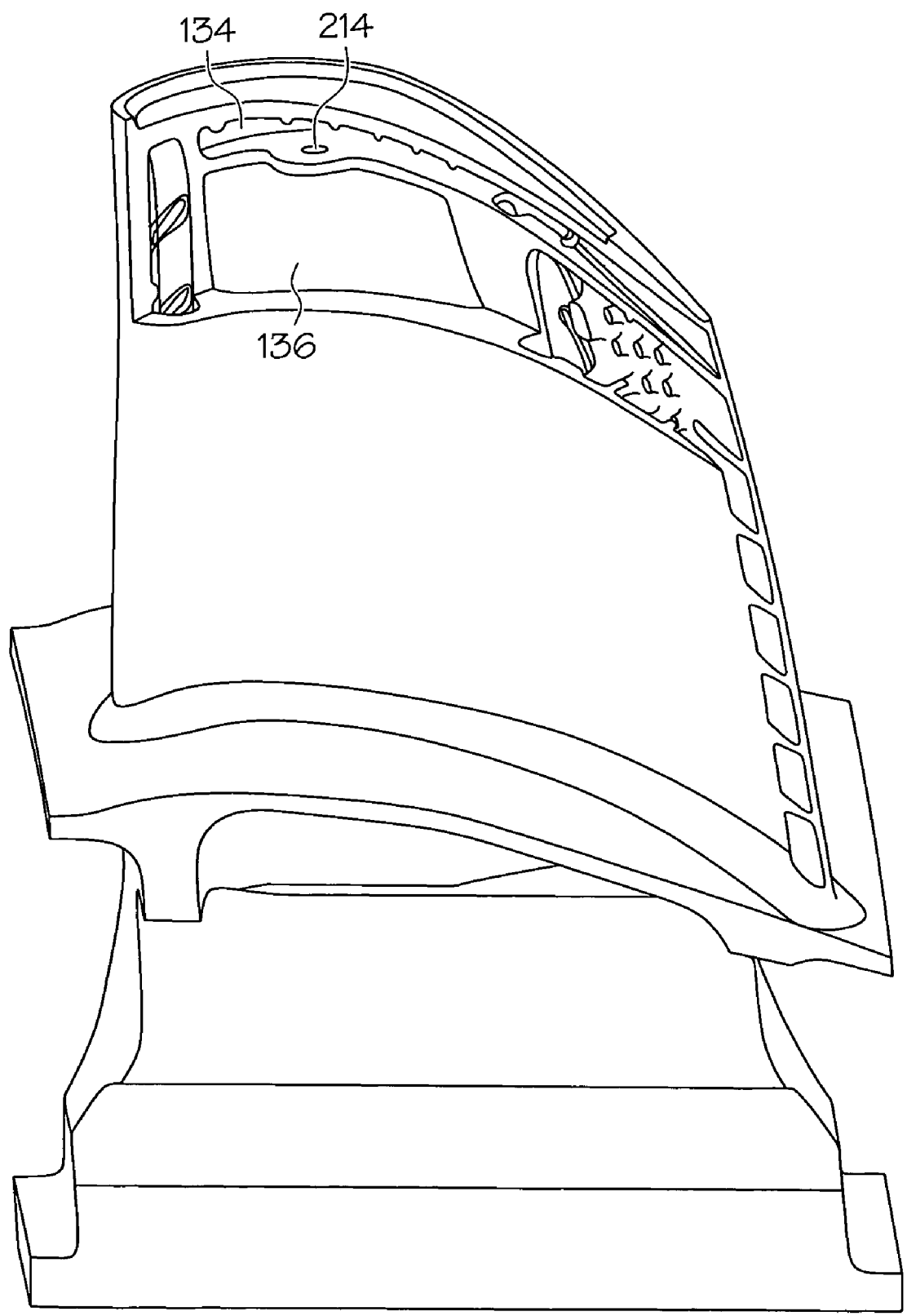
FIG. 9 is an enlarged cutaway perspective view of a center flow circuit and supercharging hole similar in direction to FIG. 4.

As shown in FIG. 9, the tip flow circuit 134 also receives a portion of its cooling air from the center flow circuit 136. The center flow circuit 136 is defined by the interior walls 138, 168; thus formed in between the pressure and suction side flow circuits 130, 132. The center flow circuit 136 includes a supercharging hole 214 that communicates with a third opening 228 into the tip flow circuit 134. In this way, pressure within the tip flow circuit 134 is increased allowing improved cooling of the pressure side wall 110 and the blade tip 122.

Preferably, the tip flow circuit 134 includes a flag section 216 and an exit section 218. The flag section 216 communicates with the suction side forward flow circuit 164 and includes rougheners that are formed on interior surface of the blade tip 122. The rougheners may be any one of numerous structures capable of augmenting heat transfer between the air and the blade 100, and in this embodiment, are shown as a plurality of turbulators 220. The exit section 218 of the tip circuit 134 also includes rougheners, such as a plurality of depressions 222, over which the cooling air flows before it exits the trailing edge exit 218. The air may alternatively exit the tip flow circuit via cooling holes 125 formed through the pressure side wall 110 and through cooling holes 160 formed through the tip 122.

Figure 10:
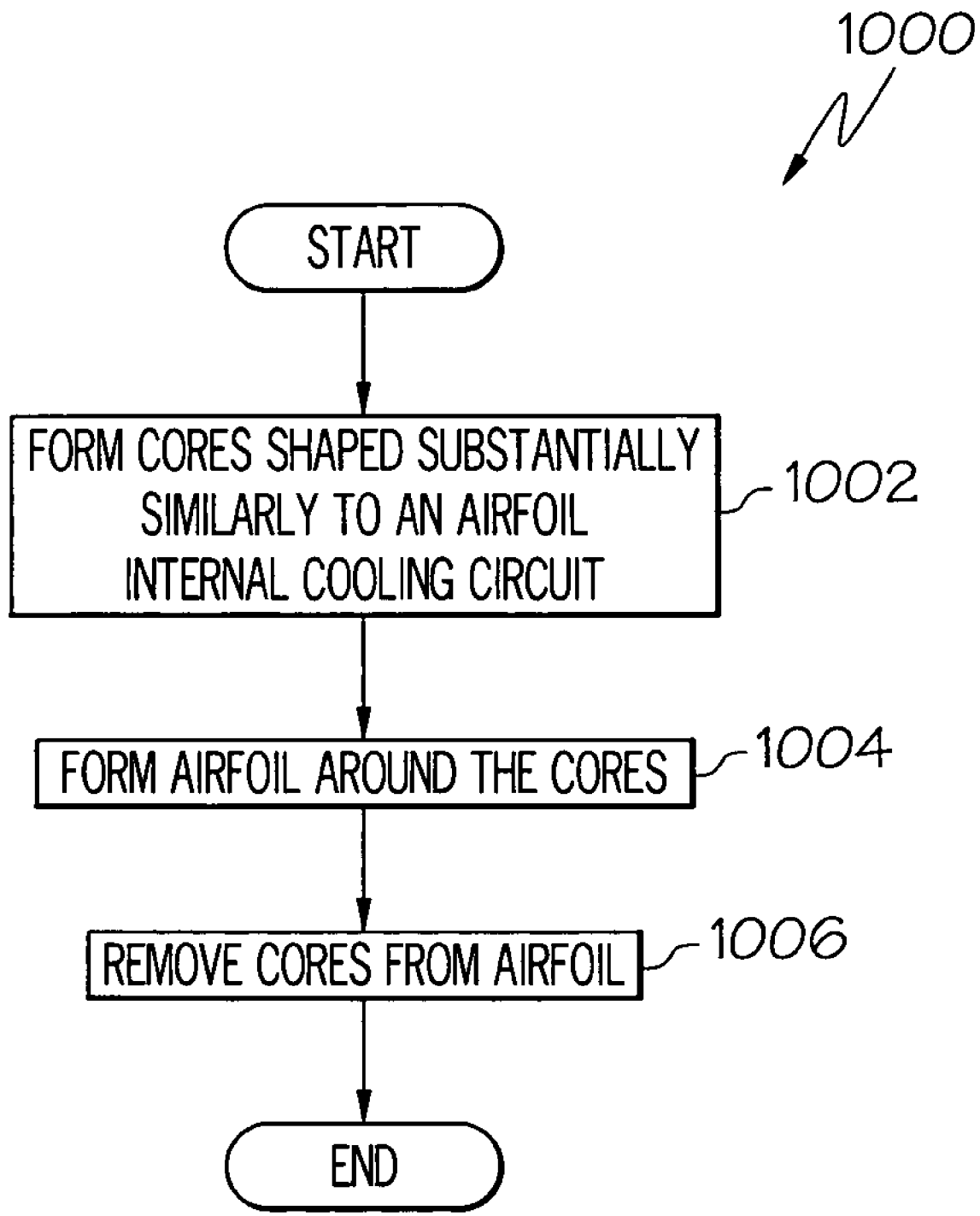
FIG. 10 is a flow diagram of an exemplary method of manufacturing the blade.

The blade 100 is produced using an exemplary method 1000 illustrated in FIG. 10. First, cores are formed that are shaped substantially similarly to the internal cooling circuit 128, step 1002. The airfoil 104 portion of the blade 100 is formed around the cores, step 1004. Then, the cores are removed from the formed airfoil 104, step 1006. Each of these steps will now be discussed in more detail below.

As briefly mentioned above, the cores are first formed and are shaped substantially similarly to the airfoil internal cooling circuit 128, step 1002. Preferably, cores are formed for the pressure side flow circuit 130, suction side flow circuit 132, tip flow circuit 134, and the center flow circuit 136. Examples of preferable flow circuit shapes are depicted in FIGS. 6 and 7. Each of the cores is formed using core dies that are shaped substantially similarly to the airfoil 104.

After the cores are formed, the airfoil is formed around the cores, step 1004. In one exemplary embodiment, the airfoil is formed using a lost wax casting process. In this regard, the cores are first placed in a wax pattern die. Wax is then injected around the cores to produce a wax pattern of the turbine blade 100. The wax pattern is dipped in ceramic slurry and dried to form a mold. The mold is then heated until the wax melts. The wax is then removed from the mold, and the mold is placed in a furnace, heated, and filled with a metal material to produce a turbine blade casting. It will be appreciated that the metal material may be any one of numerous metal materials suitable for forming the blade 100, such, as, for example, nickel-based superalloys, which may be equi-axed, directionally solidified, or single crystal.

Then, after the metal material solidifies and the blade 100 is formed, the mold is removed from the blade outer surface and the cores are removed from the blade 100, step 1006. Consequently, cavities are left in the blade 100 forming the internal cooling circuit 128 and the roughened surfaces of the walls 110, 112, 122, 138, 168 are exposed. In one exemplary embodiment, the cores are chemically removed from the blade 100 using a suitably formulated composition that dissolves the cores. Upon successful removal of the exterior mold, the core material is leached out using a traditional caustic solution, such as sodium or potassium hydroxide, as is common in the core removal industry. Verification of core removal may be accomplished using a combination of water flow, air flow, N-ray, and thermal imaging inspections.

Some of the cooling holes, such as those disposed in the interior of the blade 100, are formed after the cores are removed. For example, in some embodiments, the supercharging cooling hole 214 may need to be machined into the wall between the center flow circuit 136 and the tip flow circuit 134 to provide a flow path therebetween. In still another example, the cores may not include structures to form pressure side and blade tip cooling holes; thus, the cooling holes 125, 127, and 160 may need to be machined therein.

Hence, a new blade having improved cooling capabilities over previously known blades has been provided. The improved blade minimizes tip distress to thereby improve blade performance. Moreover, by directing cooling air directly from the root, via the suction side forward flow circuit and/or the center flow circuit, improved cooling is provided to the tip flow circuit. Additionally, a method for forming the improved blade has also been provided. The method may be incorporated into existing manufacturing processes and is relatively simple and inexpensive to implement.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An air-cooled turbine blade having an airfoil shape defined by a convex suction side wall, a concave pressure side wall, a leading edge, a trailing edge, a root and a tip, the walls and the tip each including an interior surface that defines an interior with the root, the trailing edge including a plurality of slots formed thereon, the turbine blade comprising:
    a suction side flow circuit formed within the blade interior comprising a forward and an aft flow circuit, the forward flow circuit extending from the root to the tip and defined at least by the interior surface of the convex suction side wall, the forward flow circuit including an outlet, and the aft flow circuit formed within the blade interior and defined at least in part by the convex suction side wall, the aft flow circuit comprising a serpentine passage section, a pin bank section, and a cross-over hole, the serpentine passage section in flow communication with the pin bank section, the pin bank section in flow communication with at least one of the trailing edge slots, and the cross-over hole formed on the serpentine passage section; and
    a tip flow circuit extending along the tip interior surface from the leading edge to and into at least one of the trailing edge slots and including a first and a second opening, the first opening in flow communication with the suction side forward flow circuit outlet, and the second opening in flow communication with the suction side aft flow circuit cross-over hole.

2. The turbine blade of claim 1, further comprising:
    a pressure side flow circuit formed within the blade interior and defined at least in part by the concave pressure side wall, the pressure side flow circuit including a serpentine passage.

3. The turbine blade of claim 2, further comprising:
    a center flow circuit formed within the blade interior in between the suction side flow circuit and the pressure side flow circuit and including a supercharging hole formed thereon, the supercharging hole in flow communication with the tip flow circuit.

4. The turbine blade of claim 1, further comprising:
    rougheners formed on a portion of the interior surface of at least one of the tip, convex suction side wall, and the concave pressure side wall.

5. The turbine blade of claim 4, wherein the rougheners comprise a plurality of depressions.

6. The turbine blade of claim 4, wherein the rougheners comprise a plurality of turbulators.

7. The turbine blade of claim 1, further comprising a plurality of cooling holes formed through the tip in flow communication with the tip flow circuit.

8. The turbine blade of claim 1, further comprising a plurality of cooling holes formed through the concave pressure side wall in flow communication with the pressure side flow circuit.

9. The turbine blade of claim 1, further comprising a plurality of cooling holes formed through the leading edge in flow communication with the pressure side flow circuit.

10. The turbine blade of claim 1, wherein the suction side aft flow circuit includes a plurality of cross-over holes extending between the serpentine passage section and the pin bank section.

11. An air-cooled turbine blade having an airfoil shape defined by a convex suction side wall, a concave pressure side wall, a leading edge, a trailing edge, a root and a tip, the walls and the tip each including an interior surface that defines an interior with the root, the trailing edge including a plurality of slots formed thereon, the turbine blade comprising:
    a suction side flow circuit formed within the blade interior comprising a forward and an aft flow circuit, the forward flow circuit extending from the root to the tip and defined at least by the interior surface of the convex suction side wall, the forward flow circuit including an outlet, and the aft flow circuit formed within the blade interior and defined at least in part by the convex suction side wall, the aft flow circuit comprising a serpentine passage section, a pin bank section, and a cross-over hole, the serpentine passage section in flow communication with the pin bank section, the pin bank section in flow communication with at least one of the trailing edge slots, and the cross-over hole formed on the serpentine passage section;
    a tip flow circuit extending along the tip interior surface from the leading edge to and into at least one of the trailing edge slots and including a first and a second opening, the first opening in flow communication with the suction side forward flow circuit outlet, and the second opening in flow communication with the suction side aft flow circuit cross-over hole;
    a pressure side flow circuit formed within the blade interior and defined at least in part by the concave pressure side wall, the pressure side flow circuit including a serpentine passage; and
    a center flow circuit formed within the blade interior in between the suction side flow circuit and the pressure side flow circuit and including a supercharging hole formed thereon, the supercharging hole in flow communication with the tip flow circuit.

12. The turbine blade of claim 11, further comprising:
    rougheners formed on a portion of the interior surface of at least one of the tip, convex suction side wall, and the concave pressure side wall.

13. The turbine blade of claim 12, wherein the rougheners comprise a plurality of depressions.

14. The turbine blade of claim 12, wherein the rougheners comprise a plurality of turbulators.

15. The turbine blade of claim 11, further comprising a plurality of cooling holes formed through the tip in flow communication with the tip flow circuit.

16. The turbine blade of claim 11, further comprising a plurality of cooling holes formed through the concave pressure side wall in flow communication with the pressure side cooling circuit.

17. The turbine blade of claim 11, further comprising a plurality of cooling holes formed through the leading edge in flow communication with the pressure side cooling circuit.

18. The turbine blade of claim 11, wherein the second cooling circuit includes a plurality of cross-over holes extending between the serpentine passage and the pin bank portion.

19. A method of manufacturing a blade having an airfoil shape defined by a convex suction side wall, a concave pressure side wall, a leading edge, a trailing edge, a root and a tip, the walls and the tip each including an interior surface that defines an interior with the root, the trailing edge including a plurality of slots formed thereon, the method comprising the steps of:

forming a plurality of cores shaped substantially similarly to a plurality of flow circuits comprising:

a suction side flow circuit comprising a forward and an aft flow circuit, the forward flow circuit configured to extend from the root to the tip along the interior surface of the convex suction side wall and to include an outlet, and the aft flow circuit configured to extend along the convex suction side wall and comprising a serpentine passage section, a pin bank section, and a cross-over hole, the serpentine passage section in flow communication with the pin bank section, the pin bank section in flow communication with at least one of the trailing edge slots, and the cross-over hole formed on the serpentine passage section; and a tip flow circuit configured to extend along the tip interior surface from the leading edge to and into at least one of the trailing edge slots;

forming the blade around the cores such that the tip flow circuit includes a first and a second opening, the first opening is in flow communication with the suction side forward flow circuit outlet, and the second opening is in flow communication with the suction side aft flow circuit cross-over hole; and removing the cores from the blade.

20. The method of claim 19, wherein the step of forming comprises forming a core substantially similar to a center flow circuit configured to be disposed in the blade interior between the suction side flow circuit and the tip flow circuit, and the method further comprises the step of machining a supercharging hole into the blade to provide flow communication between the center flow circuit and the tip flow circuit.

* * * * *

UNITED STATES PATENT AND TRADEMARK OFFICE
CERTIFICATE OF CORRECTION

PATENT NO. : 7,625,178 B2  Page 1 of 1
APPLICATION NO. : 11/513759
DATED : December 1, 2009
INVENTOR(S) : Morris et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Twenty-sixth Day of October, 2010

David J. Kappos
*Director of the United States Patent and Trademark Office*